United States Patent [19]

Yamazaki et al.

[11] 4,323,014
[45] Apr. 6, 1982

[54] TIE TAMPER

[75] Inventors: Kazuhide Yamazaki; Shigetoshi Ogawa; Atsushi Suma, all of Tokyo; Maki Nakajima, Ayase, all of Japan

[73] Assignees: Nippon Kokuyu Tetsudo; Kabushiki Kaisha Shibaura Seisakusho, both of Tokyo, Japan

[21] Appl. No.: 171,814

[22] Filed: Jul. 24, 1980

[30] Foreign Application Priority Data

Jan. 17, 1980 [JP] Japan .............................. 55/3087[U]

[51] Int. Cl.³ .............................................. B63F 3/02
[52] U.S. Cl. ...................................................... 104/13
[58] Field of Search ............................ 104/10, 13, 14; 404/133

[56] References Cited

U.S. PATENT DOCUMENTS

| | | | |
|---|---|---|---|
| 1,399,387 | 12/1921 | Jackson | 104/13 |
| 2,239,785 | 4/1941 | Jackson | 104/13 |
| 2,729,442 | 1/1956 | Neidhart | 217/21 |
| 2,934,026 | 4/1960 | Beierlein | 104/13 |

Primary Examiner—Richard A. Bertsch
Attorney, Agent, or Firm—Stevens, Davis, Miller & Mosher

[57] ABSTRACT

The handle of a tie tamper is connected to its vibration generating motor, which vibrates a beater fixed thereto, by a combination of a Neidhart damper secured to one end of the handle, a shackle-like link pair fixed at its one end to the damper, and an arcuate leaf spring pin-connected at its one end to the other end of the link pair and at its other end to the motor and by a two-bar linkage connected at its two ends via Neidhart dampers respectively to an intermediate part of the handle and to the motor, a balance weight being provided at the pin joint between the two links of the two-bar linkage, and a strap connected at its ends to the handle and motor limits the extension of the two-bar linkage.

6 Claims, 5 Drawing Figures

TIE TAMPER

BACKGROUND OF THE INVENTION

This invention relates to improvements in and relating to tie tampers of hand-held type used for tamping and compacting ballast gravel laid underneath ties (or sleepers) of railroad tracks.

In a tie tamper of a type known heretofore, a vibration motor (hereinafter referred to as a "vibromotor") for generating vibration as output and a handle to be grasped by an operator are connected by a leaf spring having a curve substantially of the shape of the letter S and a support leaf spring of arcuate shape. It is intended that the vibration of the vibromotor be absorbed by these leaf springs—principally by the S-shaped spring—thereby to prevent vibration from being transmitted to the handle.

In the case of a leaf spring, however, if the spring constant is made low in order to obtain a good vibration reducing characteristic, the handling characteristic of the tie tamper at the time of tamping work will become markedly poor. For this reason, it has not been possible to use springs of very low spring constants. More specifically, if an excessively weak leaf spring is used, it will be difficult for manipulative forces applied to the handle by the operator to be transmitted to the beater, which is a vibrating blade rigidly fixed to the motor, when the beater is being positioned in a specific position or when, with the beater in a state where it has been thrust into ballast gravel, it is tilted, whereby the manipulative operability of the tie tamper will become poor. For this reason, it has heretofore been necessary to use leaf springs of a certain degree of stiffness, sacrificing some of the vibration reducing characteristics of the springs. Consequently, the operators of these known tie tampers have suffered considerable fatigue.

Accordingly, the use in tie tampers of so-called Neidhart springs or dampers which have nonlinear spring characteristics, and which not only can be made to have considerably low spring constants but have various advantageous features such as high internal friction affording excellent damping characteristics is being considered.

One specific tie tamper in concrete form which reduces this concept to practice and is being considered has a handle connected to a vibromotor, to which a beater is rigidly fixed, by a combination of Neidhart dampers fixed to the handle, a shackle-like link pair fixed at one end to the square shaft of the damper, and an arcuate leaf spring pin-connected at its one end to the link pair and at its other end to the motor and by a two-bar linkage connected at its two ends via Neidhard dampers respectively to an intermediate part of the handle and to the motor, and a balance weight is provided at the pin joint between the two links of the two-bar linkage. This construction greatly reduces the vibration transmitted from the motor to the handle.

In this case, however, if the spring constants of the Neidhart dampers are so selected that when the handle of this tie tamper is grasped by the operator and pushed downward to insert the beater into ballast gravel below a railroad tie, the force applied by the operator to the handle will be transmitted well to the beater, and the vibration will also be absorbed satisfactorily, the spring constants in the reverse direction, that is, the spring constants of the dampers when the handle is pulled upward to extract the beater out from the ballast gravel underneath the tie, will become excessively small. For this reason, when the operator, holding the handle, extracts the beater out from the ballast gravel or shifts the position of the tie tamper, the link mechanism will tend to be stretched excessively, and the manipulative workability will become poor.

SUMMARY OF THE INVENTION

In view of the above described difficulty, it is an object of this invention to provide a tie tamper in which Neidhart dampers are effectively used to reduce the vibration transmitted to the handle, and in which the link mechanism forming an essential part of the vibration damping mechanism is prevented from being stretched beyond a specific degree when the handle is pulled upward to extract the beater out from ballast gravel or when the beater is being shifted in position.

We have found that this and other objects of the invention can be achieved by providing means for restricting the stretching or extension of the link mechanism to a specific limit.

According to this invention, briefly summarized, there is provided a tie tamper comprising: a motor adapted to generate vibration as output; a beater designed to be thrust at a distal end thereof into ballast gravel and rigidly fixed at its proximal end to the motor to be vibrated thereby; a handle to be grasped by an operator of the tie tamper; a support mechanism connecting one end of the handle to the motor and comprising a support spring connected at one end thereof to a part of the motor, a first Neidhart damper secured to said one end of the handle and having a non-cylindrical shaft disposed therein, and a first link fixed at one end thereof to the non-cylindrical shaft and connected at the other end thereof to the other end of the support spring; a link mechanism connecting an intermediate part of the handle to the motor and comprising a second Neidhart damper secured to the motor and having a non-cylindrical shaft disposed therein, a third Neidhart damper secured to said intermediate part of the handle and having a non-cylindrical shaft disposed therein, a second link fixed at one end thereof to the shaft of the second Neidhart damper, and a third link fixed at one end thereof to the shaft of the third Neidhart damper and pin-connected at the other end thereof to the other end of the second link, the second and third links always forming therebetween an angle less than 180 degrees; a balance weight fixed to said other end of the third link; and means for restricting said angle between the second and third links within an upper limit.

The nature, utility, and further features of this invention will be apparent from the following detailed description with respect to a preferred embodiment of the invention when read in conjunction with the accompanying drawings briefly described below.

DETAILED DESCRIPTION OF THE INVENTION

Figure 1:
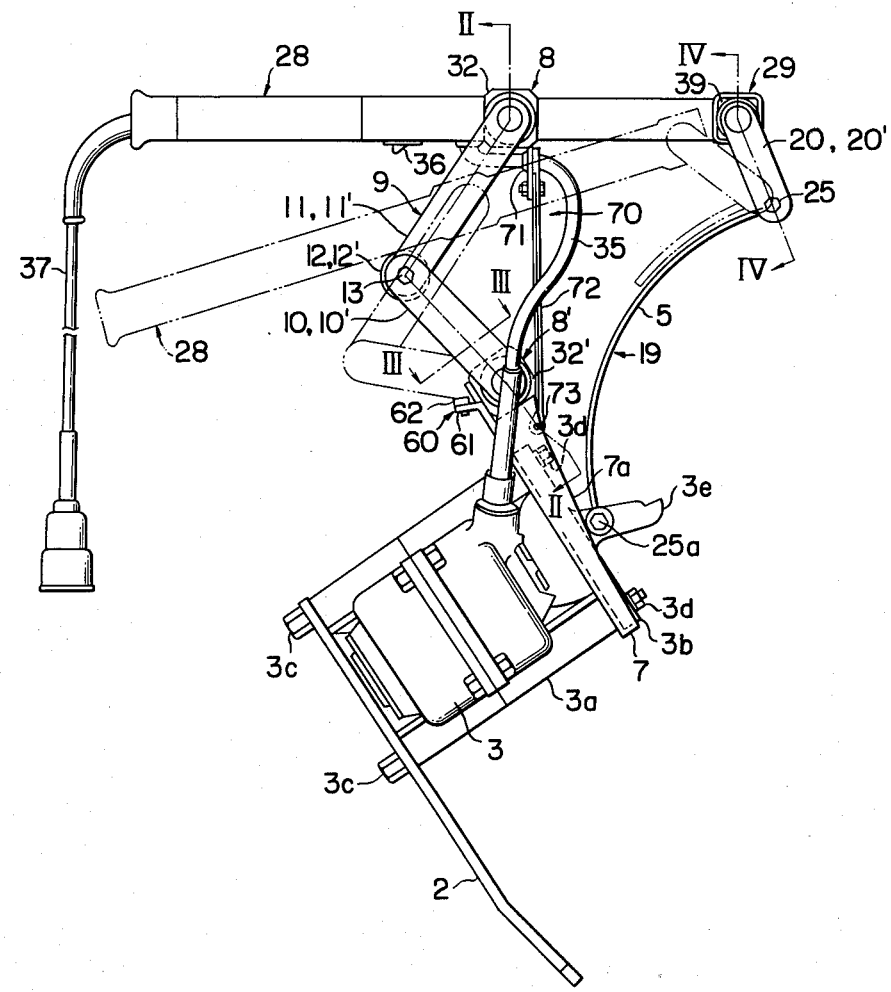
FIG. 1 is a side view of one example of a tie tamper constituting the preferred embodiment of this invention.

Referring to FIG. 1, the example of the tie tamper of the invention shown therein has a vibromotor 3 serving as a vibration generator. This vibromotor 3 has an unbalance weight (not shown) mounted on its rotor shaft to produce vibration when the rotor rotates. The vibromotor is rigidly supported by a vibromotor frame 3a with which it forms an integral structure. A beater 2 is rigidly fixed at its proximal end to one end (which may be called the bottom) of the frame 3a and extends outward therefrom to a distal end, which is to be thrust into ballast gravel. The vibromotor frame 3a is connected, as described hereinafter, to a handle 28 in a manner such that, when the handle 28 is held horizontally by the operator, the vibromotor 3 and its frame 3a are in a suspended and inclined state as shown in FIG. 1, whereby the beater 2 is directed obliquely downward, forming an angle of 45 to 60 degrees with the horizontal ground.

An attachment bracket 7 is secured to the top of the vibromotor frame 3a remoted from the beater 2. This bracket 7 has a channel-like cross section with a web and two flanges 7a and 7b (FIG. 2) extending away from the frame 3a. This bracket 7 is held at its web part by a holding plate 3b against the top of the frame 3a and projects outward therefrom. The above mentioned beater 2, the bracket 7, and the holding plate 3b are secured to the frame 3a by long bolts 3c extending through the frame and nuts 3d. As shown in FIG. 1, a projection 3e for transportation is formed integrally with the holding plate 3b at approximately the middle part thereof.

The outer casing 32 of a first Neidhart damper 8 described hereinafter is secured by welding to the above mentioned handle 28 at a position near the middle thereof. The outer casing 32' of a second Neidhart damper 8' is fixed to the above mentioned outwardly projecting end of the bracket 7. The outer casing 39 of a third Neidhart damper 29 is secured by welding to one end of the handle 28.

The handle 28 is mechanically connected to the vibromotor frame 3a essentially by a link mechanism 9 described below, a support mechanism 19 described hereinafter, and a movement limiter 70 also described hereinafter.

Figure 2:
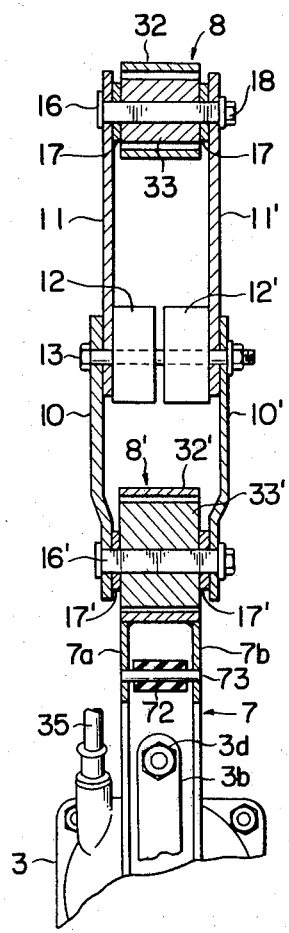
FIGS. 2, 3, and 4 are respectively views, partly in section, taken along planes indicated by lines II—II, III—III, and IV—IV in FIG. 1 as viewed in the arrow directions.
Figure 3:
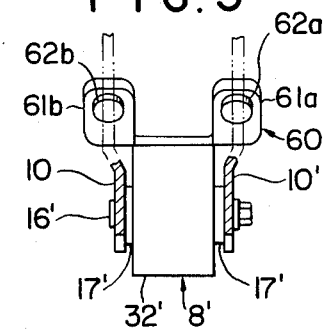

The link mechanism 9 is essentially a two-bar linkage constituted by a pair of parallelly spaced-apart first links 11 and 11' and a pair of parallelly spaced-apart second links 10 and 10' mutually pin-connected at their ends by a bolt 13 and connected at their other ends by way of the above mentioned Neidhart dampers 8 and 8', respectively, to the middle part of the handle 28 and the outwardly projecting end of the bracket 7. As best shown in FIG. 2, balance weights 12 and 12' are fixed to the ends of the first pair of links 11 and 11' at their pin connection with the second pair of links 10 and 10'. These balance weights 12 and 12' function to reduce the resonance frequency of the link mechanism 9 and, at the same time, to suppress the transmission of vibration to the handle 28.

Figure 5:
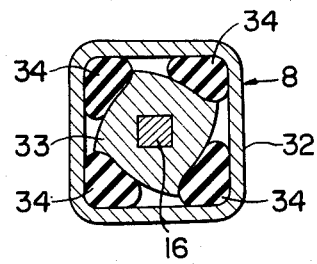
FIG. 5 is a cross section of a Neidhart damper used in the tie tamper of the invention.

As shown in FIG. 5, the first Neidhart damper is of known type comprising essentially an outer casing 32 of polygonal cross section, four solid rubber cylinders 34 for absorbing shocks positioned at the four corners of the outer casing 32, an inner shaft 33 disposed to compressively contact the inner sides of all rubber cylinders 34 and to deform in compression these rubber cylinders 34 upon being rotated by a shaft 16. As will be apparent from FIG. 2, the square shaft 16 is passed through and fitted in a square hole at the upper end of the link 11, a square through hole in the inner shaft 33, and a square hole at the upper end of the link 11' and is held in place by a nut 18. Accordingly, the first links 11 and 11', the square shaft 16, and the inner shaft 33 rotate unitarily. Spacers 17 are interposed respectively between the inner shaft 33 and the links 11 and 11'.

The second Neidhart damper has the same construction as the first damper as described above in conjunction with FIGS. 5 and 2. As shown in FIG. 2, the outer casing 32' of the second damper is secured by welding to the outer end of the outwardly projecting part of the aforementioned attachment bracket 7. The inner shaft 33' of the second damper is fixed by a square shaft 16' to the lower ends of the first links 10 and 10', spacers 17' being interposed between the inner shaft 33' and the first links.

Figure 4:
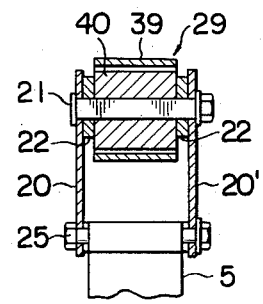

The aforementioned support mechanism 10 is connected between the third Neidhart damper 29 secured to one end of handle 28 and the top of the vibromotor frame 3a. The third damper has the same construction as the first Neidhart damper 8 described above in conjunction with FIGS. 5 and 2. As shown in FIG. 4, the outer casing 39 of this third damper is secured by welding to the one end of the handle 28. The inner shaft 40 of the third damper is unitarily connected to the upper ends of a pair of parallelly spaced-apart third links 20 and 20' by a square shaft 21 passed through and fitted in square holes formed therethrough. Spacers 22 are interposed between the inner shaft 40 and the links 20 and 20'.

The other ends of the links 20 and 20' are pin-connected by a bolt 25 to the upper end of an arcuately curved leaf spring 5. Thus the square shaft 21, the third links 20 and 20', and the bolt 25 constitute a shackle connecting the upper end of the leaf spring 5 to the third damper. The lower end of the leaf spring 5 is pin-connected by a bolt 25a to the holding plate 3b at approximately the middle part thereof.

The aforedescribed link mechanism 9 is prevented from being compressed or folded beyond a limiting state, as indicated by two-dot chain line in FIG. 1, by a movement limiter or stop 60. This stop 60 comprises lugs 61a and 61b formed integrally with the aforedescribed attachment bracket 7 and projecting outward at an angle therefrom to confront the lower parts of the links 10' and 10, respectively. The lugs 61a and 61b support rubber cushions 62a and 62b to be contacted by the lower parts of the links 10' and 10.

The link mechanism 9 is further prevented from being stretched or straightened beyond the state indicated by full line in FIG. 1 by a movement limiter 70, which in the instant embodiment is essentially a strap 72 anchored at its upper end by a bracket 71 fixed to the handle 28 and its lower end by a transverse pin 73 fixed at its two ends to the aforementioned flanges 7a and 7b of the attachment bracket 7. In the instant embodiment, the strap 72 is folded over itself after being passed around the pin 73, and its ends are fixed in lapped state to the bracket 71.

The vibromotor 3 is supplied with electric power through a cable 37 inserted into the handle 28 through the end thereof opposite the damper 29, an ON-OFF switch 36, and a cable 35.

The tie tamper according to this invention of the above described construction is manipulated and operates in the following manner. When the operator grasps the handle 28 and lifts the entire tie tamper, the link mechanism is stretched under the force of gravity to its maximum extension state as determined by the strap 72 of the movement limiter 70 and as indicated by full line in FIG. 1. With the tie tamper in this state, the outer tip of the beater 2 is placed against the surface of the ballast gravel in the vicinity of a railroad tie, and the switch 36 is turned on, whereupon the vibromotor starts and vibrates the beater 2, which thereby advances into the gravel.

When, at this start of the operation, the beater 2 is pushed downward while the handle 28 is held in an inclined attitude with the left end as viewed in FIG. 1 in raised state, a force is additionally applied by the operators arms to the beater 2, which thereby advances substantially vertically deep into the ballast gravel. Then, when the handle 28 is turned counterclockwise toward the state indicated by two-dot chain line in FIG. 1, the beater 2 is tilted so as to penetrate into the ballast gravel below the tie and thereby compacts the gravel below the tie.

At this time, the link mechanism 9 assumes its compressed state, in correspondence with which the inner shafts 33 and 33' of the first and second Neidhart dampers rotate within their outer casings 32 and 32' to deform their rubber cylinders 34 and 34'. As a result, vibration from the vibromotor 3 is absorbed by the rubber cylinders 34 and 34', and the vibration reaching the handle 28 is reduced. During this damping action, the rubber cylinders 34 and 34' effectively convert vibration energy into heat energy because of their great internal friction and thereby function as vibration dampers. As a result the vibration reaching the handle 28 is further reduced. At the same time, the third Neidhart damper connected to the support mechanism 19 also functions to effectively absorb and damp vibration.

When the handle 28 is turned by an excessively great force in the counterclockwise direction as viewed in FIG. 1, the link mechanism 9 is contracted to its limiting maximum compression state, in which the links 10 and 10' contact and press against the rubber cushions 62b and 62a of the stop 60. Accordingly, even if an abnormally great force is applied to the handle for some reason, the movement in the contracting direction of the link mechanism will be limited by the stop 60, and, at the same time, any impact action of the force will be absorbed by the rubber cushions 62a and 62b of the stop 60 undergoing deformation, whereby the tie tamper will be protected from damage. Furthermore, since the vibration of the vibromotor 3 at this time is partly absorbed by the rubber cushions 62a and 62b, there is a further vibration reducing effect.

When the handle 28 is lifted to extract the beater 2 out of the ballast gravel, the lifting force exerted on the handle 28 by the operator is transmitted directly by the strap 72 of the movement limiter 70 to the attachment bracket 7, the vibromotor frame 3a, and the beater 2. Therefore, the beater 2 can be easily drawn out, and the tamping work facilitated and made efficient. By making the strap 72 in the instant embodiment of leather or rubber having a suitable stretching and contracting characteristic, it will function cooperatively in absorbing the vibration from the vibromotor 3 when the beater 2 is being extracted from the gravel.

In the above described embodiment of this invention, both a movement limiter 70 comprising essentially the strap 72 and a stop 60 are provided, but the provision of only the movement limiter 70 is sufficient in most cases for achieving the objects of the invention.

While in the instant embodiment, a strap 72 is used for the movement limiter 70, the use of other means is possible within the intended purview of this invention. For example, at the pin joint between the links 11 and 11' and the links 10 and 10', projections and corresponding engagement lugs or the like for restricting the mutually relative rotational angles of these links can be formed thereon for the same purpose.

Furthermore, while a vibromotor 3, or vibration generating motor, is used as a vibration source in the above described embodiment, it will be obvious that other vibration producing devices such as an electromagnetic vibrator can also be used.

Because of the above described advantageous features of the tie tamper according to this invention, the transmission of vibration and impact forces to the handle is reduced to a minimum for all conceivable conditions of work, whereby fatigue of the operator due to vibration and impact forces is greatly reduced. Furthermore, the manipulative work of the tie tamper by the operator during tamping, extraction of the beater, and position shifting of the beater is greatly facilitated, whereby fatigue is further reduced and the work efficiency is greatly increased.

What we claim is:

1. A tie tamper comprising:
   a motor adapted to generate vibration as output;
   a beater designed to be thrust at a distal end thereof into ballast gravel and rigidly fixed at its proximal end to the motor to be vibrated thereby;
   a handle to be grasped by an operator of the tie tamper;
   a link mechanism connecting an intermediate part of the handle to the motor and comprising
      a first Neidhart damper secured to the motor and having a non-cylindrical shaft disposed therein,
      a second Neidhart damper secured to said intermediate part of the handle and having a non-cylindrical shaft disposed therein,
      a first link fixed at one end thereof to the shaft of the first Neidhart damper, and
      a second link fixed at one end thereof to the shaft of the second Neidhart damper and pinconnected at the outer end thereof to the other end of the first link,
      the first and second links always forming therebetween an angle less than 180 degrees;
   a support mechanism connecting one end of the handle to the motor and comprising
      a support spring connected at one end thereof to a part of the motor,
      a third Neidhart damper, secured to said one end of the handle and having a non-cylindrical shaft disposed therein, and
      a third link fixed at one end thereof to the non-cylindrical shaft and connected at the other end thereof to the other end of the support spring; and
   a balance weight fixed to said other end of the second link.

2. A tie tamper according to claim 1, wherein the motor is rigidly supported and partly enclosed by a motor frame, and the second Neidhart damper is mounted on an attachment bracket fixed to the motor frame.

3. A tie tamper according to claim 1, wherein each of the first, second, and third links comprises a pair of parallelly spaced-apart links.

4. A tie tamper according to claim 1 in which the means for restricting said angle within an upper limit comprises a strap having vibration-absorbing resilience and anchored at one end thereof to the handle and at the other end thereof to said motor.

5. A tie tamper according to claim 1 or 3, further comprising means for restricting said angle between the first and second links within a lower limit.

6. A tie tamper according to claim 5 in which the means for restricting said angle within a lower limit comprises a projecting member fixed at a proximal end thereof to the motor and confronting at a distal end thereof a part of said first link in the path of movement thereof and a rubber cushion fixed to the distal end of the projecting member to be contacted by said first link and thereby limiting further movement of the first link.

* * * * *